US005094046A

United States Patent [19]
Preiswerk

[11] Patent Number: 5,094,046
[45] Date of Patent: Mar. 10, 1992

[54] DEPLOYABLE MAST

[75] Inventor: Peter R. Preiswerk, Santa Barbara, Calif.

[73] Assignee: Astro Aerospace, Carpinteria, Calif.

[21] Appl. No.: 462,952

[22] Filed: Jan. 8, 1990

Related U.S. Application Data

[63] Continuation of Ser. No. 293,770, Jan. 5, 1989, abandoned.

[51] Int. Cl.$^5$ ............................................. E04H 12/00
[52] U.S. Cl. ........................................ 52/108; 52/632; 52/645; 52/646
[58] Field of Search .................. 52/108, 646, 632, 645

[56] References Cited

U.S. PATENT DOCUMENTS

| | | | |
|---|---|---|---|
| 3,486,279 | 12/1969 | Webb | 52/108 |
| 3,783,573 | 1/1974 | Vaughan | 52/646 |
| 4,276,726 | 7/1981 | Derus | 52/109 |
| 4,334,391 | 6/1982 | Hedgepeth et al. | 52/108 |
| 4,337,560 | 7/1982 | Slysh | 29/155 R |
| 4,480,415 | 11/1984 | Truss | 52/108 |
| 4,532,742 | 8/1985 | Miura | 52/108 |
| 4,557,097 | 12/1985 | Mikulas, Jr. et al. | 52/646 |
| 4,569,176 | 2/1986 | Hedgepeth et al. | 52/645 |
| 4,599,832 | 7/1986 | Benton et al. | 52/118 |
| 4,655,022 | 4/1987 | Natori | 52/646 |
| 4,662,130 | 5/1987 | Miura et al. | 52/108 |
| 4,667,451 | 5/1987 | Onoda | 52/646 |
| 4,677,803 | 7/1987 | Mikulas, Jr. et al. | 52/646 |
| 4,679,961 | 7/1987 | Stewart | 403/341 |
| 4,866,892 | 9/1989 | Satoh et al. | 52/108 |

Primary Examiner—James L. Ridgill, Jr.
Attorney, Agent, or Firm—Spensley Horn Jubas & Lubitz

[57] ABSTRACT

In a deployable mast composed of: a plurality of resiliently flexible longeron elements; a plurality of resiliently flexible lateral elements arranged in groups of lateral elements constituting batten frames spaced apart along the longeron elements and delimiting respective bays of the mast, with each group of lateral elements being connected to all of the longerons; and a plurality of flexible diagonal elements each connected between two longeron elements and extending between two groups of lateral elements, the longeron, lateral and diagonal elements being constructed and connected to constitute a structure movable between a deployed state defining a column of predetermined length and a stowed state defining a structure having a length less than the predetermined length, there are provided five such longeron elements and each group of lateral elements is connected to all of the longeron elements.

14 Claims, 2 Drawing Sheets

DEPLOYABLE MAST

This is a continuation of application Ser. No. 07/293,770 filed on Jan. 5, 1989, now abandoned.

BACKGROUND OF THE INVENTION

The present invention relates to a deployable mast, particularly for use in space vehicles.

Deployable masts, or lattice columns, are used in a variety of environments, including both space and terrestrial applications. Such columns are subject to destruction, for example by impacting micrometeorites in space applications, or by shrapnel, as when used for military applications in terrestrial environments.

Known structures of this type, disclosed in U.S. Pat. Nos. 3,486,279 and 4,334,391, are composed of three longitudinal members, or longerons, between which are connected a plurality of lateral elements. The lateral elements include both battens and diagonal members, pairs of the diagonal members being cross-connected to generally laterally opposed points along the longerons, thereby defining a bay of the column. In the structure disclosed in U.S. Pat. No. 4,334,391, the diagonal members are connected to the longerons such that adjacent bays substantially overlap. The battens connect the laterally opposed connection points of the diagonal members and serve to tension the diagonal members when the mast is in a deployed state.

The mast components are constructed and interconnected to be movable relative to one another so that when no external forces are imposed, the mast assumes a deployed orientation in which the longerons extend parallel to one another along straight lines or coaxial helices. External forces can be applied to the mast to cause it to assume a stowed configuration in which the mast structure has a significantly shorter length. Movement between the deployed configuration and the stowed configuration is accompanied by coiling of the longerons about the longitudinal axis of the mast so that the mast structure assumes a coiled position.

These known structures have proven to be satisfactory and have been employed as booms destined to support large solar arrays of a communications satellite as well as instruments and antennae on scientific spacecrafts. The spectic strength, i.e., strength-to-weight ratio, of the known structure, disclosed in U.S. Pat. No. 3,486,279, has been increased substantially, as disclosed in U.S. Pat. No. 4,334,391, by doubling the number of lateral elements. The diagonal members of this latter construction are connected to the longerons such that adjacent bays overlap substantially. In addition to the increased specific strength, the reliability of this construction is improved because the structural integrity is maintained even when one of the lateral elements is destroyed.

Nevertheless, applications which are envisioned for the future, such as proposed space stations, require structures having long useful lives in more hostile environments where the structures are exposed to space debris, or for flights which pass through asteroid belts or planetary rings. For such applications, there is reason to believe that the structures described above could not be relied upon to provide the requisite reliability, particularly since structural damage to any one longeron would be expected to destroy the structural integrity of the mast and would cause it to collapse to a greater or lesser extent.

SUMMARY OF THE INVENTION

It is an object of the present invention to provide an improved deployable mast which is capable of maintaining its structural integrity even if subjected to significant damage to any of its members.

Another object of the invention is to provide a novel mast structure having a higher specific strength than the known structures disclosed in U.S. Pat. No. 3,486,279.

The above and other objects are achieved, according to the present invention, in a deployable mast composed of: a plurality of resiliently flexible lateral elements arranged in groups of lateral elements constituting batten frames spaced apart along the longeron elements and delimiting respective bays of the mast, with each group of lateral elements being connected to all of the longerons; and a plurality of flexible diagonal elements each connected between two longeron elements and extending between two groups of lateral elements, the longeron, lateral and diagonal elements being constructed and connected to constitute a structure movable between a deployed state defining a column of predetermined length and a stowed state defining a structure having a length less than the predetermined length, by the improvement wherein: the plurality of flexible longeron elements comprise five such longeron elements; and each group of lateral elements is connected to all of the longeron elements.

By providing the mast with five longerons, preferably equispaced from one another to define the corners of a regular pentagon, a significantly improved capability for maintaining structural integrity is achieved. In fact, calculations have shown that even if one longeron section was completely missing, the strength of the mast would be reduced by not more than 30 percent, while the structural integrity, i.e., the ability of the mast to remain in its deployed state, would be maintained.

Moreover, the provision of five longerons permits a relatively short distance to be maintained between batten frames, or a relatively short bay length, so that the mast will have a relatively high load carrying capability. The possibility of providing a relatively short bay length is aided by connecting each diagonal element, according to a further feature of the invention, between longerons which are not adjacent to one another. With this arrangement, the diagonal elements are relatively long, which allows the achievement of a bay length-to-mast diameter ratio similar to that achieved in the known mast described in U.S. Pat. No. 4,334,391. The result is a relatively strong structure.

According to a further feature of the invention, each batten frame is constructed in a preferred configuration to provide in a weight-effective manner, sufficient lateral stiffness while maintaining the batten preload required to pretension the diagonals.

DESCRIPTION OF THE PREFERRED EMBODIMENTS

Figure 1:
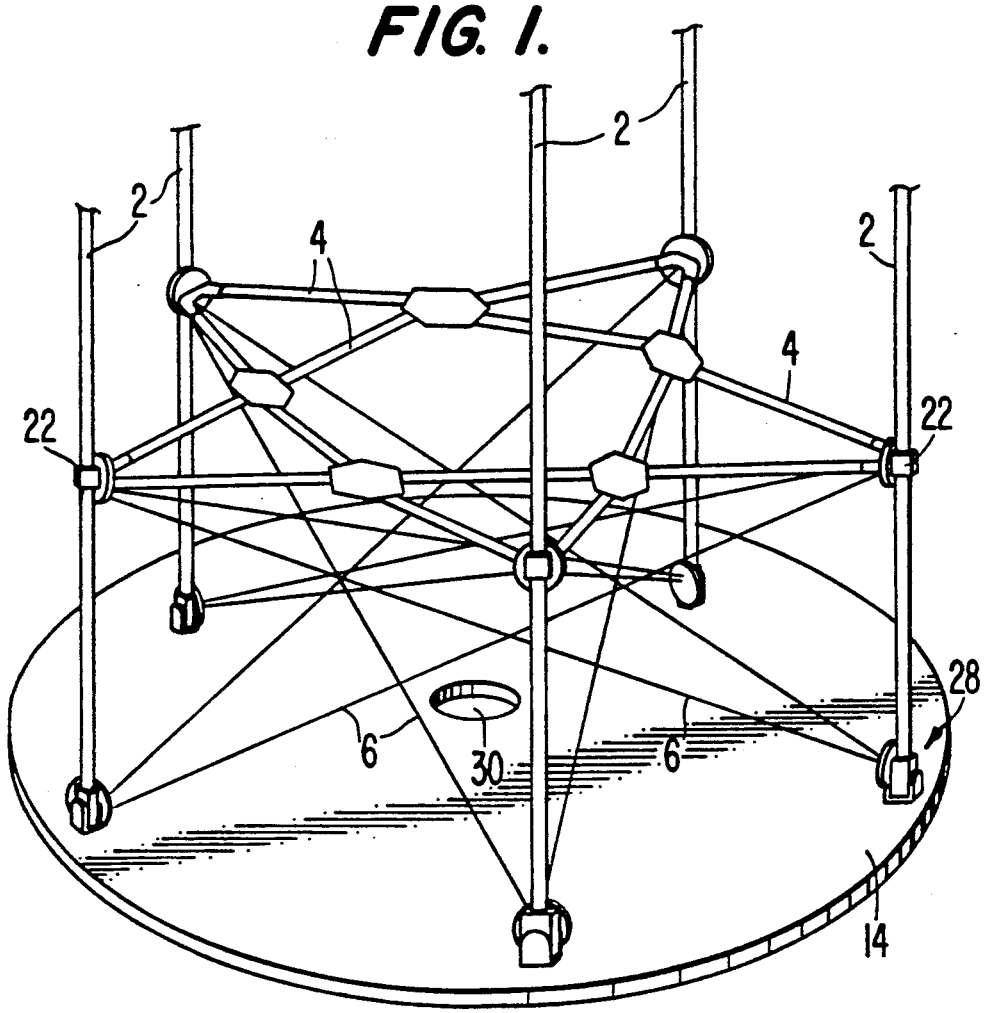
FIG. 1 is a perspective view of the lowermost bay of a deployed mast according to a preferred embodiment of the present invention.

FIG. 1 illustrates one end bay, in this case the lowermost end bay, of a deployable mast according to the invention, FIG. 1 illustrating the mast structure in its deployed state.

The mast is composed of five coilable longeron elements 2 located to define, when the mast is deployed, the corners of a regular pentagon. Longeron elements 2 are mounted between two opposed platforms, one of which is shown at 14 in FIG. 1. Each longeron element 2 can be made of a fiberglass composite, or laminate, and may have a circular, rectangular, or other desired cross section. The composition and dimensions of longeron elements 2 are such that they will tend to assume a straight configuration, but may be coiled to follow a helical path centered on the longitudinal axis of the mast when the mast is deformed into its stowed configuration.

In general, the longerons are straight and parallel in the deployed configuration. However, in special cases, a small helical angle of the longerons may be maintained in the fully deployed configuration in order to provide the mast with an intentional twist. Typically, the degree of twist employed causes the ends of each longeron to be angularly offset from one another by an angle of 72 degrees or an integral multiple thereof.

At spaced locations along the length of the mast, there are disposed a plurality of batten frames, one of which is shown in FIG. 1, each batten frame lying in a plane perpendicular to the longitudinal axis of the mast, and being composed of a plurality of batten members, or lateral elements, 4. Each batten member 4 can be made of a unidirectional fiberglass composite, or laminate, and may have a circular, oval, rectangular, or other suitable cross section.

The supporting structure is completed by a plurality of diagonal members 6 each extending between a point of connection of a batten frame to one longeron element 2 and the point of connection of the adjacent batten frame or of one of the end platforms 14 to a longeron element 2 which is not adjacent to the one longeron. Thus, each diagonal member 6 is given a substantial length. Each diagonal member 6 can be constituted by a fiberglass composite, or laminate, or a metal cable, and acts in tension as struts on the deployed mast.

A total of ten diagonal members 6 extends between each adjacent pair of batten frames, or each end batten frame and the adjacent platform 14. Thus, in the structure illustrated in FIG. 1, there will be, in addition to the ten diagonal members 6 illustrated, ten further diagonal members extending diagonally upward from the points of connection of the batten frame to longeron elements 2. In other words, the pattern of batten members 4 and diagonal members 6 is repeated along the length of the mast.

Figure 2:
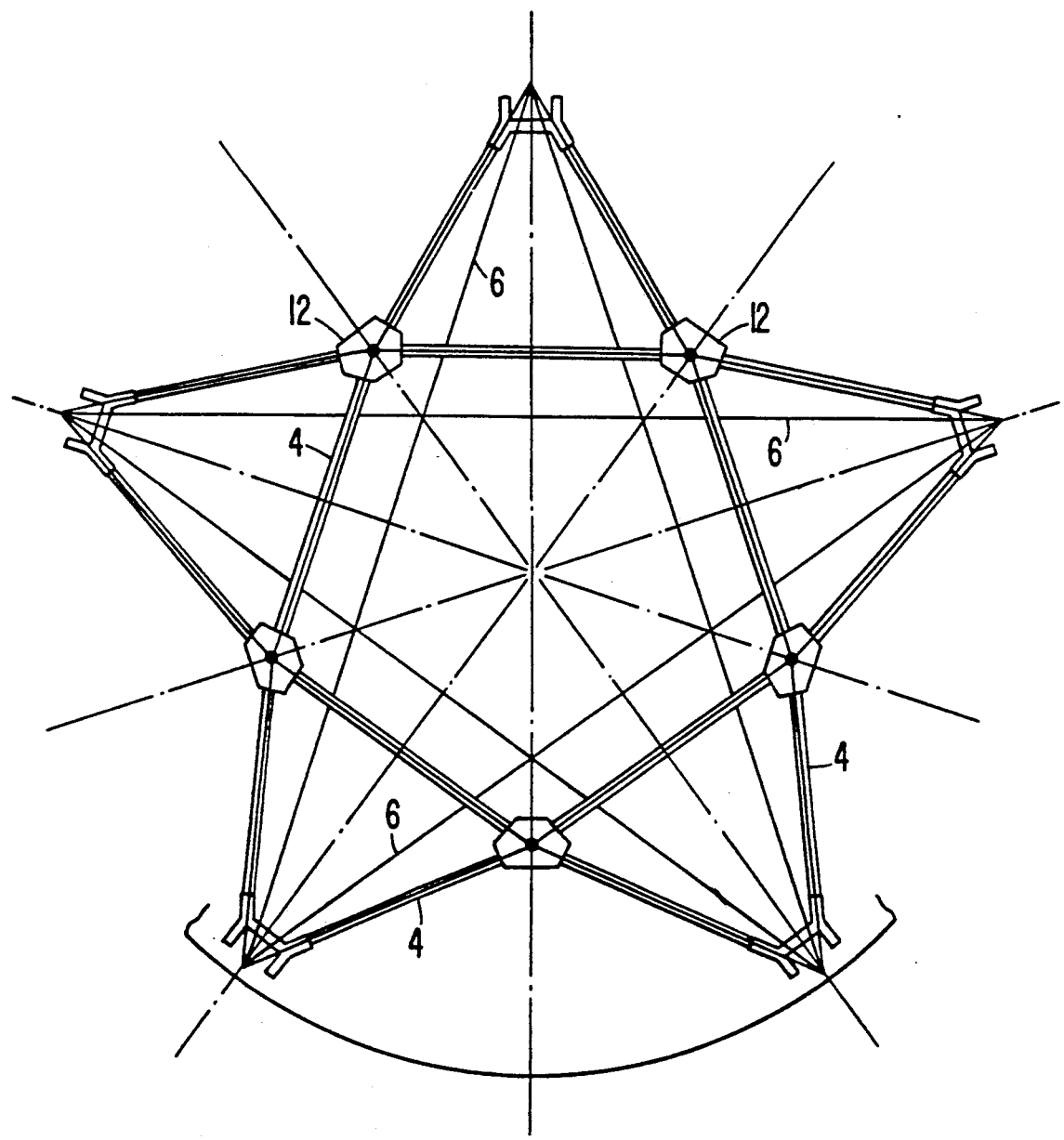
FIG. 2 is a plan view showing one batten frame and associated diagonals of the mast of FIG. 1.

Referring to FIG. 2, in conjunction with FIG. 1, it will be seen that each batten frame is composed of five batten members 4 arranged in the form of a regular pentagon, and an additional ten batten members 4 forming, with each element of the regular pentagon, an equilateral triangle having an apex fastened to a respective longeron element. Thus, all of the batten members 4 are theoretically of the same length.

To form a batten frame, the batten members 4 are secured together by metal fittings 12, each being a solid metal block provided on appropriate lateral faces with blind bores dimensioned to permit a respective batten member 4 to be tightly fitted therein. Batten members 4 are bonded in those blind bores by a suitable adhesive.

While batten members 4 are shown in FIGS. 1 and 2 to each have an essentially straight configuration when the mast is in its deployed state, they will, according to preferred embodiments of the invention, be dimensioned to be slightly bowed when the mast is in that state. Batten members 4 then act to maintain diagonal members 6 under tension.

The described batten frame structure exhibits a high degree of stiffness with respect to deformations in the plane of the batten frame, in a weight-effective manner.

The batten frames and diagonal members 6 are connected to longeron elements 2 by corner pivot fittings of the type disclosed in U.S. Pat. No. 4,334,391, and illustrated in FIGS. 3 and 4.

Figure 3:
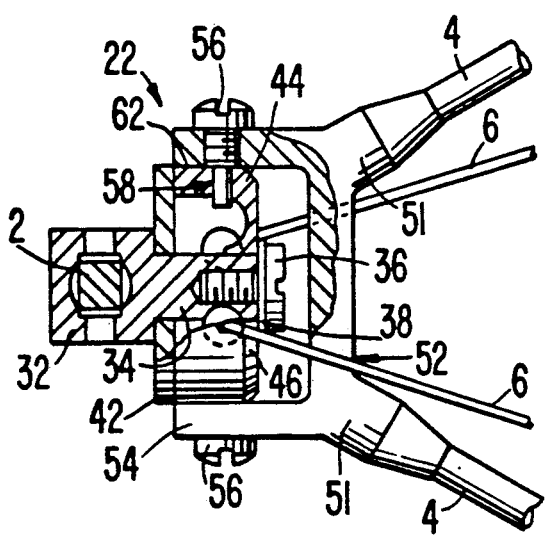
FIG. 3 is a view, partially in horizontal cross-section, of a longeron and a corner pivot fitting.
Figure 4:
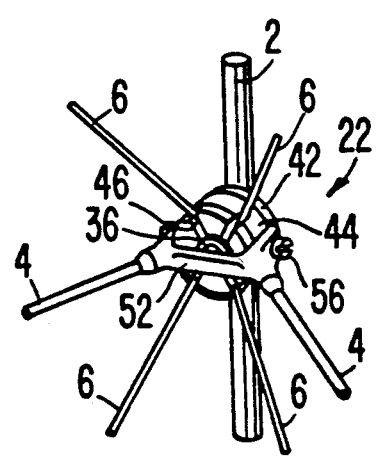
FIG. 4 is a perspective view of the corner pivot fitting shown in FIG. 3.

Each corner pivot fitting 22, shown partially in horizontal section in FIG. 3, consists of a pivot fitting 32 which surrounds, and preferably is adhesively bonded to, a longeron element 2. Projecting from the pivot fitting is a pivot stud 34 which is internally threaded to receive a bolt 36. Bolt 36 holds under its head a washer 38 and holds a backplate 42 and a cup 44 on stud 34. Cup 44 includes keyhole-shaped slots or openings 46 which receive knobs formed at the ends of the diagonal members 6, the knobs and cup 44 thereby attaching diagonal members 6 to the corner pivot fitting as shown in FIG. 4.

The batten members 4 are received in, and adhesively secured to, openings formed in projecting bosses 51 on a batten saddle member 52. This member includes projecting arms 54, each of which has an internally threaded opening to receive the threaded shaft of a bolt 56. Bolts 56 also include studs 58 which are received in opposed openings 62 in cup 44, thereby attaching batten members 4 to the corner pivot fitting. The bosses 51 are arranged such that their axes are separated by an angle of 60 degrees and intersect at the longitudinal axis of the associated longeron element 2.

Preferably, the axes of the four diagonal members 6 connected to the same longeron element intersect at the longitudinal axis of the associated longeron element. In addition, since adjacent bays, each bay being constituted by one array of batten members 4 and one array of diagonal members 6, as illustrated in FIG. 1, do not overlap one another, it is assured that the diagonal members 6 and batten members 4 connected to the same longeron 2 will not interfere with one another when the mast is in its deployed state.

By virtue of the attachment of batten members 4 to corner pivot fittings 22, batten saddle member 52 may rotate relative to cup 44. Also, by virtue of the manner of attachment of cup 44 to the corner pivot fitting, cup 44 may rotate about pivot stud 34. This design of the corner pivot fitting permits the battens and diagonal members to rotate and move relative to longeron elements 2 as the longeron elements are being coiled or uncoiled, yet firmly holds each longeron element in a given position when the column has been deployed.

Thus, each corner pivot fitting 22 permits the batten members 4 connected thereto to rotate about an axis perpendicular to, and intersecting, the longitudinal axis of the mast. Similarly, each longeron element 2 is pivotally connected to each platform 14 by a fitting 28 which permits the longeron element to pivot about an axis perpendicular to, and intersecting, the longitudinal axis of the mast. Each fitting 28 carries a rotatable member similar to back plate 42 and cup 44 of FIGS. 3 and 4 for supporting the two diagonal members connected to the associated longeron element at the level of the platform.

The resulting mast assembly can be placed into its stowed, or coiled, configuration by rotating platforms 14 relative to one another about the longitudinal axis of the mast until adjacent longerons 2 come to lie upon one another. During this coiling movement, each diagonal member 6 will assume approximately the configuration of a circular arc, each group of diagonal members being layered between adjacent batten frames, leaving free a circular opening at the mast center. This circular opening can be used, in a self-deploying mast, for passage of a control lanyard. The lanyard or cable can pass through an opening 30 provided in the center of lower platform 14 and can be coupled to the upper platform (not shown). The lanyard can be used in a known manner to control the extension rate of the mast and to facilitate manual coiling.

Coiling of the longerons for stowage may be achieved, also, by external application of an axial force against the partially coiled longerons resting on the rotatable platform at the base of the mast within a stowage container. Reversal of the controlled force allows deployment of the mast. This type of construction is called canister-deployed as opposed to the self-deploying type of mast.

A typical embodiment of the present invention could have a diameter of the order to 12.5 inches and a length of the order of 7 feet, and could be composed of 15 bays. These dimensions would provide a bay length-to-diameter ratio of the order of 0.45.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A deployable mast comprising:
a plurality of resiliently flexible longeron elements;
a plurality of resiliently flexible lateral elements arranged in groups of lateral elements constituting batten frames spaced apart along the longeron elements and delimiting respective bays of the mast, with each group of lateral elements being connected to all of the longerons, wherein each batten frames comprises five lateral elements arranged in the form of a regular pentagon and an additional ten lateral elements forming with each element of the regular pentagon, an equilateral triangle having an apex fastened to a respective longeron element; and
a plurality of flexible diagonal elements each connected between two longeron elements and extending between two groups of lateral elements, the longeron, lateral and diagonal elements being constructed and connected to constitute a structure movable between a deployed state defining a column of predetermined length and a stowed state defining a structure having a length less than the predetermined length, wherein said plurality of flexible longeron elements comprise five such longeron elements, and each said group of lateral elements is connected to all of said longeron elements.

2. A deployable mast as defined in claim 1 wherein said longeron elements are positioned relative to one another such that, when said mast is in the deployed state, said longeron elements define the corners of a polygon, and each said diagonal element is connected between two said longeron elements defining nonadjacent corners of the polygon.

3. A deployable mast as defined in claim 2 wherein the polygon has a regular pentagonal form.

4. A deployable mast as defined in claim 2 wherein each said diagonal element extends between two mutually adjacent groups of lateral elements.

5. A deployable mast as defined in claim 4 wherein each said group of lateral elements comprises:
a first set of lateral elements connected together to form the sides of a polygon; and
a second set of lateral elements connected to said first set at points corresponding to the corners of the polygon to form with said first set of lateral elements a plurality of triangles each having a vertex at which said group of lateral elements is connected to a respective one of said longeron elements.

6. A deployable mast as defined in claim 5 wherein the polygon is a regular pentagon.

7. A deployable mast as defined in claim 6 further comprising a plurality of rigid connecting members connecting together said lateral elements of each said group, each said connecting member having a plurality of bores each receiving one end of a respective lateral element.

8. A deployable mast as defined in claim 7 further comprising adhesive means bonding each lateral element end in its associated connecting member bore.

9. A deployable mast as defined in claim 8 wherein each said longeron element and lateral element is constructed to generate internal forces which urge each said longeron element and lateral element into a straight configuration.

10. A deployable mast as defined in claim 1 wherein each said group of lateral elements comprises:
a first set of lateral elements connected together to form the sides of a polygon; and
a second set of lateral elements connected to said first set at points corresponding to the corners of the polygon to form with said first set of lateral elements a plurality of triangles each having a vertex at which said group of lateral elements is connected to a respective one of said longeron elements.

11. A deployable mast as defined in claim 10 wherein the polygon is a regular pentagon.

12. A deployable mast as defined in claim 11 further comprising a plurality of rigid connecting members connecting together said lateral elements of each said group, each said connecting member having a plurality of bores each receiving one end of a respective lateral element.

13. A deployable mast as defined in claim 12 further comprising adhesive means bonding each lateral element end in its associated connecting member bore.

14. A deployable mast as defined in claim 13 wherein each said longeron element and lateral element is constructed to generate internal forces which urge said element into a straight configuration.

* * * * *